Patented Nov. 24, 1953

2,660,586

UNITED STATES PATENT OFFICE 2,660,586

11 ALPHA-HYDROXY - 17 ALPHA-METHYL-TESTOSTERONES AND ESTERS THEREOF

Herbert C. Murray, Hickory Corners, and Durey H. Peterson, Kalamazoo, Mich., assignors to The Upjohn Company, Kalamazoo, Mich., a corporation of Michigan No Drawing. Application July 1, 1952,
Serial No. 296,727

7 Claims. (Cl. 260—397.4)

This invention relates to steroids and more particularly to 11α-hydroxy-17α-methyltestosterone and to 11α-hydroxy-10-normethyl-17α-methyltestosterone and esters thereof.

It is an object of the present invention to provide the novel 11α-hydroxy-17α-methyltestosterone and the novel 11α-hydroxy-10-normethyl-17α-methyltestosterone and their esters. Other objects will be apparent to those skilled in the art to which this invention pertains.

The novel hydroxyl compounds of the present invention are represented by the following formula:

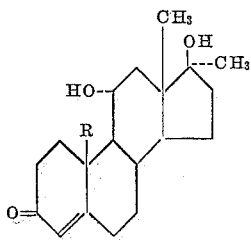

wherein R is hydrogen or methyl. They may be prepared by subjecting 17α-methyltestosterone or 10-normethyl-17α-methyltestosterone to the oxygenating action of a culture of fungus of the order Mucorales as described in the applications of which this is a continuation-in-part, Serial No. 180,486, filed August 19, 1950, now abandoned, and serial No. 272,944, filed February 23, 1952, now Patent 2,602,769, issued July 8, 1952.

The following examples are illustrative of a process for the production of the compounds of the present invention but are not to be construed as limiting.

*Example 1.—11α-hydroxy-17α-methyltestosterone*

A medium was prepared of twenty grams of Edamine enzymatic digest of lactalbumin, three grams of corn steep liquor and fifty grams of technical dextrose diluted to one liter with tap water and adjusted to a pH of 4.7 after sterilization. Three liters of this sterilized medium was inoculated with *Rhizopus nigricans* minus strain, American Type Culture Collection Number 6227b, and incubated for 24 hours at a temperature of 28 degrees centigrade using a rate of aeration and agitation such that the oxygen uptake was 6.3 to 7 millimoles per hour per liter of $Na_2SO_3$ according to the method of Cooper, Fernstrom and Miller, Ind. Eng. Chem., 36, 504 (1944). To this medium containing a 24 hour growth of *Rhizopus nigricans* minus strain was added 1.48 grams of 17α-methyltestosterone in thirty milliliters of absolute ethanol to provide a suspension of the steroid in the culture. After an additional 24-hour period of incubation under the same conditions of temperature and aeration, the beer and mycelium were extracted. The mycelium was filtered, washed twice, each time with a volume of acetone approximately equal to the volume of the mycelium, and extracted twice, each time with a volume of methylene chloride approximately equal to the volume of the mycelium. The acetone and methylene chloride extracts including solvent were added to the beer filtrate. The mixed extracts and beer filtrate were extracted successively with two one-half by volume portions of methylene chloride and then with two one-fourth by volume portions of methylene chloride. The combined methylene chloride extracts were washed with two one-tenth by volume portions of a two percent aqueous solution of sodium bicarbonate and then with two one-tenth by volume portions of water. After drying the methylene chloride with about three to five grams of anhydrous sodium sulfate per liter of solvent and filtering, the solvent was removed by distillation. The extractives, obtained upon evaporation of the methylene chloride solvent, weighed 3.3407 grams.

1.095 grams of the solvent free extractives was dissolved in 110 milliliters of benzene and chromatographed over a column containing 55 grams of alumina which had been washed with hydrochloric acid, then washed with water, and dried for four hours at 120 degrees centigrade. Developing solvents were used in 110-milliliter portions as indicated in the accompanying table.

TABLE

| Fraction | Solvent | Eluate solids, milligrams |
| --- | --- | --- |
| 1 | Benzene | 13.2 |
| 2 | Benzene-ether 9:1 | 11.7 |
| 3 | do | 62.1 |
| 4 | Benzene-ether 1:1 | 10.1 |
| 5 | do | 5.5 |
| 6 | Ether | 4.0 |
| 7 | do | 4.7 |
| 8 | do | 4.1 |
| 9 | Ether-chloroform 19:1 | 6.0 |
| 10 | do | 4.1 |
| 11 | do | 4.8 |
| 12 | Ether-chloroform 9:1 | 5.4 |
| 13 | do | 5.9 |
| 14 | do | 4.2 |
| 15 | Ether-chloroform 1:1 | 3.8 |
| 16 | do | 11.0 |
| 17 | do | 8.0 |
| 18 | Chloroform | 4.2 |
| 19 | do | 113.8 |
| 20 | do | 67.0 |
| 21 | Chloroform-acetone 19:1 | 42.8 |
| 22 | do | 20.8 |
| 23 | do | 27.4 |
| 24 | Chloroform-acetone 9:1 | 67.2 |
| 25 | do | 56.1 |
| 26 | do | 40.9 |
| 27 | Chloroform-acetone 1:1 | 103.4 |
| 28 | do | 31.8 |
| 29 | do | 18.0 |
| 30 | Acetone | 19.7 |
| 31 | do | 8.8 |
| 32 | do | 4.2 |
| 33 | Acetone-methanol 1:1 | 34.2 |
| 34 | do | 12.3 |
| 35 | do | 6.5 |
| 36 | Methanol | 7.4 |
| 37 | do | 2.5 |

Fractions 22 through 28, freed of solvent, were taken up in methylene chloride, slurried with 0.3 gram of Magnesol magnesium silicate, filtered, evaporated to dryness, and crystallized from four milliliters of ethyl acetate. The resulting crystals were recrystallized from 0.5 milliliter of ethyl acetate to give 98.2 milligrams of 11-hydroxy-17α-methyltestosterone, having a melting point of 160 to 162 degrees centigrade, and an optical rotation of $[\alpha]_D^{23}$ of plus 62 degrees (C is 1.026 in chloroform).

*Analysis.*—Percent calculated for $C_{20}H_{30}O_3$: C, 75.43; H, 9.50. Found: C, 75.59; H, 9.51. C, 75.20; H, 9.54.

*Example 2.—11α-hydroxy-10 - normethyl-17α-methyltestosterone (·1α,17β - dihydroxy - 17α-methyl-4-estrene-3-one)*

4-estrene-3,17-dione [Marker and Rohrmann, J. Am. Chem. Soc., 62, 73 (1940)], which can also be prepared by the oxidation of 10-normethyltestosterone with chromimum trioxide ($CrO_3$), is reacted with about four molar equivalents of anhydrous pyrrolidine in benzene at the boiling point of the reaction mixture in a flask fitted with a reflux condenser and a water trap so arranged that the condensed vapors pass through the water trap before returning to the reaction flask. After refluxing for about one hour, a catalytic amount of para-toluenesulfonic acid is added to the reaction mixture whereafter refluxing is continued until about one molar equivalent of water is collected in the water trap. Distillation of the reaction mixture to dryness leaves a residue of 3-(N-pyrrolidyl)-3,5-estradiene-17-one which is dissolved in anhydrous ether, reacted with a molar excess of methyl magnesium iodide, and thereafter the reaction mixture is treated with dilute hydrochloric acid, to produce 10-normethyl-17α-methyltestosterone. Washing the ether phase with water and thereafter distilling the dried ether solution to dryness leaves a residue of 10-normethyl-17α-methyltestosterone demonstrating marked androgenic activity.

In the same manner as described in Example 1, 11α - hydroxy-10-normethyl - 17α - methyltestosterone is prepared from 10-normethyl-17α-methyltestosterone by subjecting the latter steroid to the oxygenating activity of *Rhizopus nigricans* minus strain, American Type Culture Collection Number 6227b. The resulting oxygenated steroid is isolated from the fermentation mixture in the same manner as described in Example 1 and purified 11α-hydroxy-10-normethyl-17α-methyltestosterone is obtained by crystallization of the reaction product from ethyl acetate.

*Example 3.—11α-propionyloxy-17α-methyltestosterone*

To fifty milligrams of 11α-hydroxy-17α-methyltestosterone dissolved in one milliliter of pyridine, dried over barium oxide, was added five milliliters of a solution of 0.4 milliliter of propionic anhydride diluted to ten milliliters with dry pyridine. After fifteen hours at room temperature, the reaction mixture was diluted to fifty milliliters with water. The diluted mixture was extracted five times with 25-milliliter portions of diethyl ether. The combined ether extract was washed twice with ten-milliliter portions of two percent hydrochloric acid, then once with ten milliliters of water, once with ten milliliters of two percent sodium bicarbonate and once again with ten milliliters of water. The washed extract was dried over anhydrous sodium sulfate, filtered, and the ether was evaporated at room temperature to leave a residue of crude 11α-propionyloxy-17α-methyltestosterone.

This residue was recrystallized from solution in a minimum of methanol by the dropwise addition of petroleum ether to yield pure 11α-propionyloxy-17α-methyltestosterone.

*Example 4.—11α - (β-cyclopentyl) propionyloxy-10-normethyl-17αmethyltestosterone*

Following the procedure of Example 3, using the equivalent proportion of β-cyclopentylpropionyl chloride in place of propionic anhydride and 11α - hydroxy-10-normethyl - 17α-methyltestosterone in place of 11α - hydroxy - 17α-methyltestosterone produced 11α - (β - cyclopentyl) propionyloxy - 10-normethyl - 17α-methyltestosterone.

In a similar manner other esters of 11α-hydroxy-17α-methyltestosterone and 11α-hydroxy-10-normethyl-17α - methyltestosterone are prepared according to the described acylation procedures. Representative esters of 11α-hydroxy-17α - methyltestosterone and 11α-hydroxy-10-normethyl - 17α-methyltestosterone thus prepared include one to eight carbon atom carboxylic acid acyloxy esters of saturated or unsaturated, aliphatic, carbocyclic, or cycloaliphatic, aryl, arylalkyl, alkaryl, mono, di or polycarboxylic acids which form ester groups such as, for example, formyloxy, acetoxy, propionyloxy, dimethylacetoxy, trimethylacetoxy, butyryloxy, valeryloxy, hexanoyloxy, heptanoyloxy, octanoyloxy, benzoxy, phenylacetoxy, toluoyloxy, napthoyloxy, cyclopentylformyloxy, β - cyclopentylpropionyloxy, acrylyloxy, cyclohexylformyloxy, the half and di-esters of malonic, maleic, succinic, glutaric and adipic acids, and the like. The acids may also contain non-interfering substituents, such as mono or poly halo, chloro, bromo, hydroxy, methoxy, and the like, if desired.

The novel compounds of the present invention are stable to heat and dilute acid. They demonstrate anesthetic and inhibitory luteoid, glucocorticoid, spermatogenic, renotropic, testoid, hypertensive and progesterone activities. Dehydration of 11α-hydroxy-17α-methyltestosterone with phosphorous oxychloride or hydrogen chloride in glacial acetic acid followed by oxidation with chromium trioxide, CrO3, is productive of adrenosterone. Similarly 11α - hydroxy - 10-normethyl-17α-methyltestosterone treated with phosphorus oxychloride or hydrogen chloride in glacial acetic acid followed by oxidation with chromium trioxide CrO3, is productive of 4-estrene-3,11,20-trione otherwise identified as 10-normethyladrenosterone having androgenic hormone activity.

It is to be understood that the invention is not to be limited to the exact details of operation or exact compounds shown and described as obvious modifications and equivalents will be apparent to one skilled in the art and the invention is therefore to be limited only by the scope of the appended claims.

We claim:

1. A compound represented by the graphical formula:

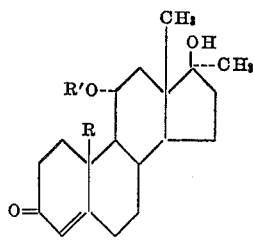

wherein R is selected from the radicals consisting of hydrogen and methyl, and R' is selected from the radicals consisting of hydrogen and hydrocarbon-carboxylic acyl radical containing less than nine carbon atoms.

2. 11α-hydroxy-17α-methyltestosterone.

3. 11α - hydroxy - 10 - normethyl - 17α - methyltestosterone.

4. 11α - acyloxy - 17α - methyltestosterone represented by the structural formula:

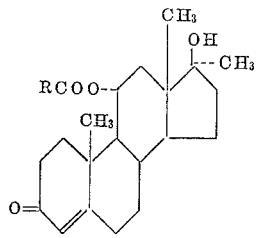

wherein R is a hydrocarbon radical containing less than nine carbon atoms.

5. 11α - acyloxy - 10 - normethyl - 17α - methyltestosterone represented by the structural formula:

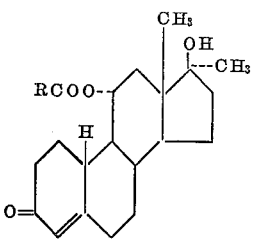

wherein R is a hydrocarbon radical containing less than nine carbon atoms.

6. 11α-propionyloxy-17α-methyltestosterone.

7. 11α - (β - cyclopentyl)propionyloxy - 10-normethyl-17α-methyltestosterone.

HERBERT C. MURRAY.
DUREY H. PETERSON.

No references cited.